Feb. 3, 1959  A. J. HIRST  2,872,207
SPRING SUSPENSION FOR MULTI-WHEEL ROAD-VEHICLE BOGIES
Filed March 22, 1956  3 Sheets-Sheet 1
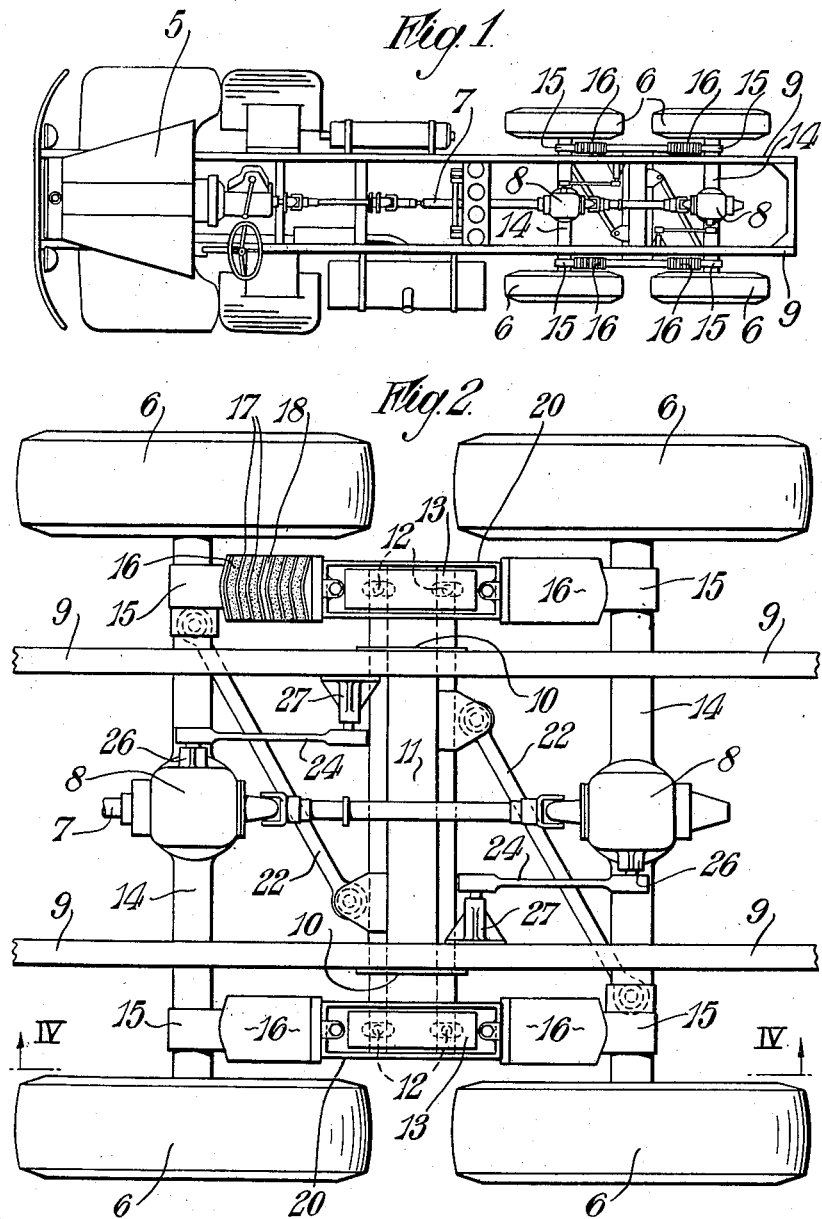
INVENTOR
ARCHIE JOHN HIRST
BY
Harness, Dickey & Pierce
ATTORNEYS Feb. 3, 1959 A. J. HIRST 2,872,207
SPRING SUSPENSION FOR MULTI-WHEEL ROAD-VEHICLE BOGIES
Filed March 22, 1956 3 Sheets-Sheet 2

INVENTOR
ARCHIE JOHN HIRST
BY
Harness, Dickey & Pierce
ATTORNEYS

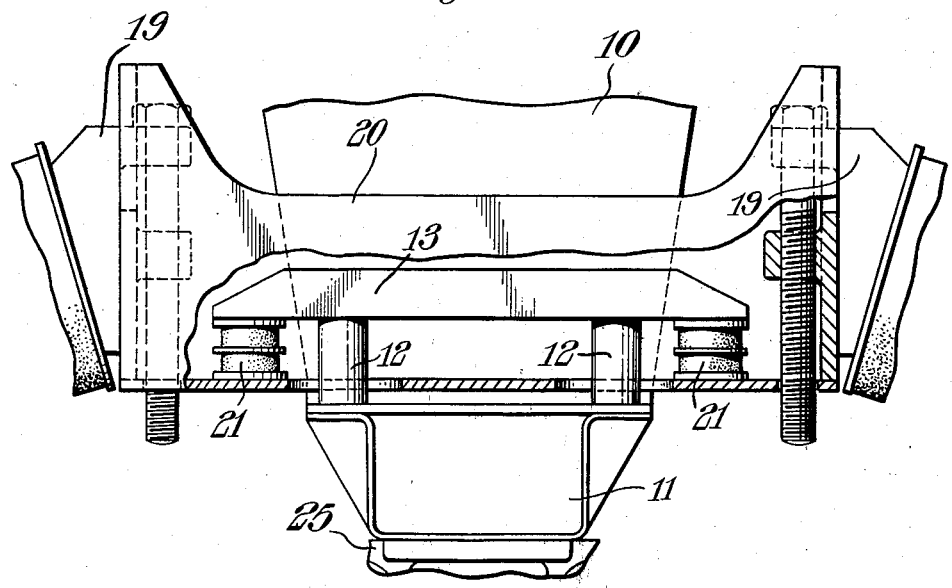

United States Patent Office 2,872,207
Patented Feb. 3, 1959

2,872,207

SPRING SUSPENSION FOR MULTI-WHEEL ROAD-VEHICLE BOGIES

Archie John Hirst, Leicester, England, assignor to Metalastik Limited, Leicester, England Application March 22, 1956, Serial No. 573,110

Claims priority, application Great Britain March 30, 1955

8 Claims. (Cl. 280—104.5)

This invention concerns spring suspension for vehicles and relates to suspensions for four-wheel assemblies, more particularly of road vehicles such as six- or eight-wheeled vehicles having a four-wheel rear bogie. The invention has reference to suspensions of the kind incorporating rubber or the like springs which under load are in combined shear and compression.

The main object of the invention is the provision of means for equalising the load on the wheels at each side of the vehicle bogie when, for instance, the wheels move over uneven ground or rise over an obstacle.

An object of the invention is to equalise the compression forces in the rubber or like springs at each side of the vehicle.

A further object is to produce compression forces on equalisation of the load on the wheels such as to compensate for non-equalisation of the shearing forces of the springs.

Figure 3:
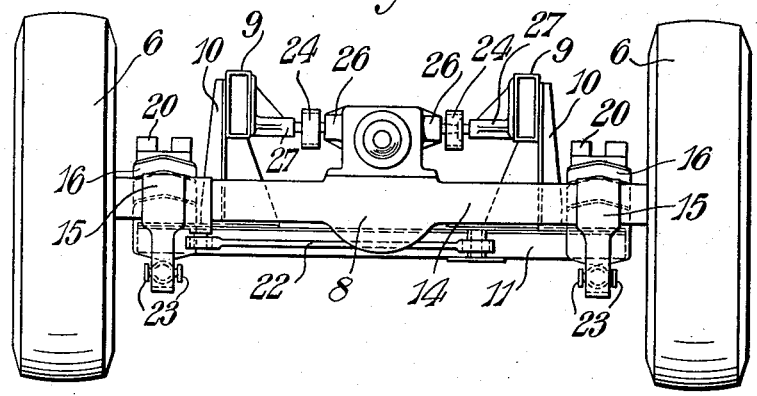
Figure 4:
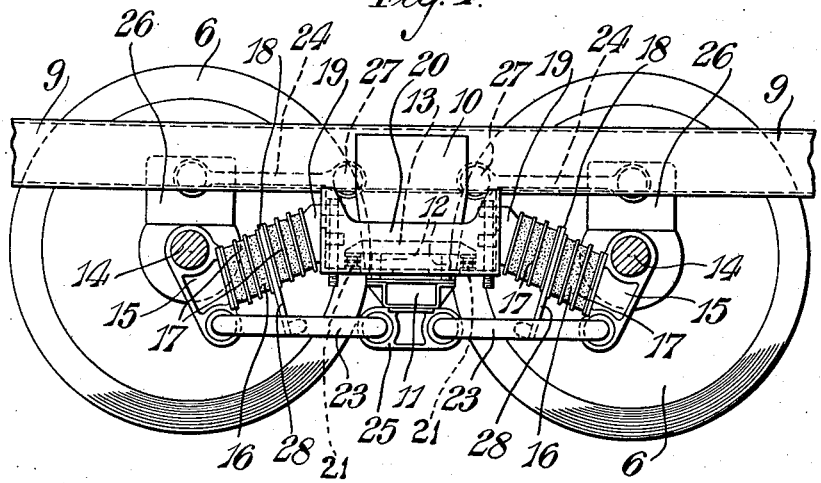

These and other objects of the invention will be better understood from the practical application of the invention which will now be described, by way of example only, with reference to the accompanying drawings whereof:

Figure 1 is a plan view of a road vehicle incorporating a four-wheel bogie in accordance with this invention, Figure 2 is a plan view to a larger size of the bogie of Figure 1, Figure 3 is an end view of the bogie shown in Figure 2, Figure 4 is a sectional view on the line IV—IV of Figure 2, and Figure 5 is a side view, partly in section, and to a larger size showing the details of construction of a part of a bogie according to this invention.

Referring to Figure 1: the road vehicle comprises an engine 5 to drive the rear wheels 6 through a transmission shaft 7 and rear axle differential gear 8 all in known manner. The vehicle has side frames 9 to which the bogie, comprising the wheels 6, is attached.

The bogie comprises a bracket 10 for each side frame secured thereto and depending therefrom (Figure 4). A cross member 11 is attached to each bracket 10, the member 11 carrying a pair of pillars 12 near each bracket to which a platform 13 is rigidly attached.

The wheels 6 are carried in usual manner by axles 14 and a bracket 15 on each axle abuts a spring assembly 16 comprising rubber or the like disc units with metal interleaves 17 and an intermediate plate 18. The assembly engages a wedge 19 carried by a beam 20 and the spring assemblies, in known manner, are in combined shear and compression under load.

The beam 20 is thrust upwardly by spring assemblies 16. The beam is hollow and receives platform 13, the pillars 12 passing each through a slot in the bottom plate of the beam (see Figure 5). Between said bottom plate and platform 13 is a pair of rubber or the like blocks 21 and it will be appreciated that the blocks are in compression under the vehicle load but that the beam 20 is relatively free for longitudinal and transverse movement, the blocks 21 then acting in shear. In this way the beam is permitted sliding movement lengthwise of the vehicle as later described.

The cross member 11 is connected to each axle 14 by a cross rod 22 the rods extending transversely of the vehicle and preventing relative transverse movement of the axles. In this way the beam 20 has freedom mainly for longitudinal movement.

Each axle 14 is carried from the vehicle frame by links 23, 24, the former of which is pivoted to bracket 15 (and hence to the axle) and to an anchor 25 secured to cross member 11 and the latter of which is pivoted to bracket 26 (carried by the axle) and to an anchor 27 secured to the frame member 11.

The freedom for the beam 20 to move lengthwise may be controlled by shear resistance of the blocks 21 or in any other known or convenient way.

In use: when the leading wheel of a pair at one side of the vehicle is raised due, for instance, to the wheel riding over uneven ground or an obstacle the associated spring assembly will be compressed since its axle is raised—this being permitted by links 23, 24. The compressive force in the spring assembly is applied to wedge 19 and thence to beam 20 so that the latter is moved rearwardly thereby compressing the spring assembly of the rear wheel of the pair. Consequently the load on the pair of wheels is equalised. Similar considerations apply when the rear of the pair of wheels at one side of the vehicle is raised relatively to the front or leading wheel. The extent to which the load on the pair of wheels is equalized is limited by shear of the spring assembly.

With the arrangement described the links 23, 24 are under considerable tension due to spring assemblies 16, these being pre-compressed on assembly of the bogie. The lower link 23 is heavily loaded in this way. Consequently with sideways movement of the axles the links are transversely displaced and the tension loading of the links tends to resist such movement and to restore the axle to its original position—the so-called horizontal pendulum effect of the links.

A particular advantage results from the use of a cross rod in conjunction with the horizontal pendulum effect— which is additional in its effect to the cross rod in resisting side movement of the axles relatively to the vehicle frame. By raising the cross rod the height of the roll centre is correspondingly raised with the result that the lower links 23 are moved transversely to a greater extent for a given roll of the sprung mass of the vehicle. Consequently the restoring force due to the horizontal pendulum effect is considerable and may in practice be sufficient to dispense with the conventional stabiliser bar.

The wedges 19 may be adjustable to take up creep or set of the spring assemblies.

The intermediate plates 18 are anchored to links 23 by a strap 28 so that movement of the plates, on spring deflection, is controlled to prevent canting of the plates.

A suspension according to this invention finds application to bogies for railways e. g. for a lightweight railcar in which one axle is driven in similar manner to a road vehicle through a bevel or worm gear and the other axle runs freely, the axles being suspended from the frame as described above.

What I claim is:

1. A vehicle suspension comprising a fixed frame, two pairs of wheels, one pair on each side of the vehicle, an axle member carrying each wheel, a beam for each pair of wheels, a support for carrying the beam from the frame for movement lengthwise of the vehicle, a parallel-motion linkage connecting the axle member with the frame for rising and falling movements of the axle and, for each pair of wheels, a rubber spring connected to each axle and a beam to transfer forces therebetween, said springs being in combined shear and compression.

2. A vehicle suspension comprising a fixed frame, two pairs of wheels, one in front of the other at each side of the vehicle, a common axle for the front pair of wheels, a common axle for the rear pair of wheels, a beam for each pair of wheels said beam being located horizontally between the front and rear axles, a support carrying the beam from the frame for movement longitudinally between the axles, for each axle a parallel-motion linkage connected to the frame and axle by which the axles are permitted independent vertical movement relatively to the frame, for each wheel, a rubber spring in compression connected to the axle and each beam to urge the axles apart so that the links of the parallel motion linkage are in tension, each spring being near its wheel and being in combined shear and compression under load.

3. A vehicle suspension comprising a fixed frame, two pairs of wheels, one pair on each side of the vehicle, an axle member carrying each wheel, a beam for each pair of wheels, a rubber block connected between each end of the beam and the frame to allow, by shear deformation of the block, the beam movement relatively to the plane lengthwise of the vehicle, a parallel-motion linkage connecting the axle member with the frame for rising and falling movements of the axle and, for each pair of wheels, a rubber spring connected to each axle and a beam to transfer forces therebetween, said springs being in combined shear and compression.

4. A vehicle suspension comprising a fixed frame, two pairs of wheels, one in front of the other at each side of the vehicle, a common axle for the front pair of wheels, a common axle for the rear pair of wheels, a beam for each pair of wheels said beam being located horizontally between the front and rear axles, a support carrying the beam from the frame for movement longitudinally between the axles, for each axle a parallel-motion linkage connected to the frame and axle by which the axles are permitted independent vertical movement relatively to the frame, for each wheel, a rubber spring in compression connected to the axle and each beam to urge the axles apart so that the links of the parallel motion linkage are in tension, each spring being near its wheel and being in combined shear and compression under load.

5. A vehicle suspension comprising a fixed frame, two pairs of wheels, one pair on each side of the vehicle, an axle member carrying each wheel, a beam for each pair of wheels, a support for carrying the beam from the frame for movement lengthwise of the vehicle, a first link below the axle connecting the frame with the axle, a second link above the axle and parallel with said first link connecting the frame with the axle, said links constituting a parallel-motion linkage permitting rising and falling movements of the axle relatively to the frame and, for each pair of wheels, a rubber spring connected to each axle and a beam to transfer forces therebetween, said springs being in combined shear and compression.

6. A vehicle suspension comprising a fixed frame, two pairs of wheels, one in front of the other at each side of the vehicle, a common axle for the front pair of wheels, a common axle for the rear pair of wheels, a beam for each pair of wheels said beam being located horizontally between the front and rear axles, a support carrying the beam from the frame for movement longitudinally between the axles, for each axle a first link below the axle connecting the frame with the axle, a second link above the axle and parallel with said first link connecting the frame with the axle, said links constituting a parallel-motion linkage permitting rising and falling movements of the axle relatively to the frame, for each wheel, a rubber spring in compression connected to the axle and each beam to urge the axles apart so that the links of the parallel motion linkage are in tension, each spring being near its wheel and being in combined shear and compression under load.

7. A vehicle suspension comprising a fixed frame, two pairs of wheels, one pair on each side of the vehicle, an axle member carrying each wheel, a beam for each pair of wheels, a support for carrying the beam from the frame for movement lengthwise of the vehicle, a first link below the axle connecting the frame with the axle, a second link above the axle and parallel with said first link connecting the frame with the axle, said links constituting a parallel-motion linkage permitting rising and falling movements of the axle relatively to the frame and, for each pair of wheels, a rubber spring connected to each axle and a beam to transfer forces therebetween, said springs being in combined shear and compression.

8. A vehicle suspension comprising a fixed frame, two pairs of wheels, one in front of the other at each side of the vehicle, a common axle for the front pair of wheels, a common axle for the rear pair of wheels, a beam for each pair of wheels said beam being located horizontally between the front and rear axles, a rubber block connected between each end of the beam and the frame to allow, by shear deformation of the block, the beam movement relatively to the frame longitudinally between the axle, for each axle a first link below the axle connecting the frame with the axle, a second link above the axle and parallel with said first link connecting the frame with the axle, said links constituting a parallel-motion linkage permitting rising and falling movements of the axle relatively to the frame, for each wheel, a rubber spring in compression connected to the axle and each beam to urge the axles apart so that the links of the parallel motion linkage are in tension, each spring being near its wheel and being in combined shear and compression under load.

References Cited in the file of this patent

UNITED STATES PATENTS

| 2,386,620 | Loyd | Oct. 9, 1945 |
| 2,750,200 | Scheel | June 12, 1956 |

FOREIGN PATENTS

| 648,516 | Great Britain | Jan. 3, 1951 |
| 716,563 | Great Britain | Oct. 6, 1954 |